Figure 1:
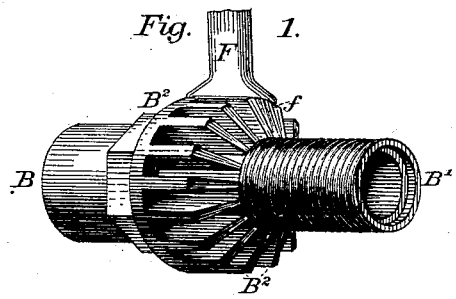

(No Model.)

S. S. NUCKOLLS.
VEHICLE WHEEL.

No. 425,900. Patented Apr. 15, 1890.

Witnesses:
T. B. Keefer
Joseph H. Hannen

Inventor:
Shelley S. Nuckolls
by R. S. Dyrenforth,
his Attorney.

THE NORRIS PETERS CO., PHOTO-LITHO., WASHINGTON, D. C.

UNITED STATES PATENT OFFICE.

SHELLEY SAMUEL NUCKOLLS, OF CONYERS, GEORGIA.

VEHICLE-WHEEL.

SPECIFICATION forming part of Letters Patent No. 425,900, dated April 15, 1890.

Application filed October 3, 1889. Serial No. 325,857. (No model.)

*To all whom it may concern:*

Be it known that I, SHELLEY SAMUEL NUCKOLLS, a citizen of the United States, residing at Conyers, in the county of Rockdale and State of Georgia, have invented certain new and useful Improvements in Vehicle-Wheels; and I do hereby declare the following to be a full, clear, and exact description of the invention, such as will enable others skilled in the art to which it appertains to make and use the same.

This invention relates to vehicle-wheels.

The object of the invention is to produce a hub and spoke for a vehicle-wheel of such form that the parts will be prevented from becoming loose in use, and at the same time permit the withdrawal of a spoke or of spokes in case of necessity of repair or for other reasons.

Furthermore, the object of the invention is to produce a hub in which the axle-box may be removed without injury to the spokes when worn and a new one inserted; and, finally, the object of the invention is to produce a hub and spoke which shall be simple, light, strong, and inexpensive of construction.

With these objects in view the invention resides, essentially, in a hub composed of two parts, one of which has a screw-threaded longitudinally-projecting tubular core designed to contain a removable axle-box and provided on its main portion with a ridge of mortises and a collar having slanting sides, forming the ends of the mortises, against which the flaring sides of the spoke-tenons designed to enter the mortises are placed, the ends of the mortises being cut at an angle, whereby when the smaller portion of the hub, which also has a collar with a face slanting in the opposite direction, is screwed into position upon this tubular core on the first or main portion and held in position by set-screws or in any other manner the spokes will be confined in place and cannot be removed until the parts of the box are separated.

Furthermore, the invention resides, essentially, in a hub having an axle-box composed of metal somewhat less in diameter at one end than at the other and having at its larger end a ridge or projection made integral therewith, fitting into grooves or channels on the inner periphery of the hub, whereby the box is prevented from turning; and it has also a shoulder designed to fit into a recess in the hub, forming a bearing-surface against which the axle-collar may rest.

Furthermore, the invention resides in a box having openings for the spoke-tenons, wider at their inner than at their outer ends, and spokes having ends flaring outward at an angle corresponding in degree to those of the mortises.

I have illustrated the invention in the accompanying drawings, in which—

Figure 2:
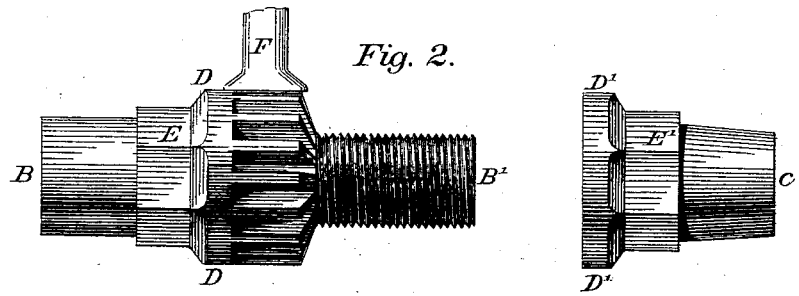
Figure 4:
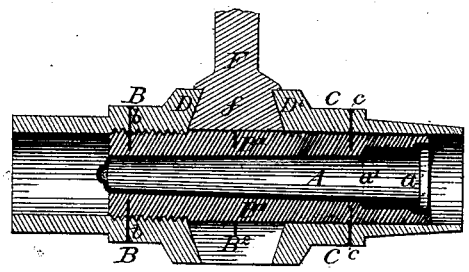
Figure 3:
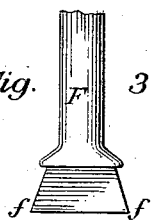

Figure 1 represents a perspective view of my improved hub, showing the mortises with their slanting ends into which the spoke-tenons are designed to rest. Fig. 2 represents a detailed view of the hub, showing the main portion with the projecting tubular core upon which the second portion is to be screwed, showing, also, the second portion. Fig. 3 is a side elevation of the spoke; and Fig. 4 is a transverse sectional view of my invention, showing the parts in operative position, showing, also, the means for retaining the spoke in position, and showing the removable axle-box.

In the drawings, A represents the tapering axle-box, composed of metal, having the shoulder, lug, or projection $a$ on its inner end, against which the collar of the axle is designed to rest. This axle-box is screwed or otherwise fixed in a tubular core composed of iron, wood, or other suitable material, but preferably of wood, in the interior of the hub, and is provided on the larger end with one or more notches or ridges designed to engage corresponding depressions in the inner periphery of the hub, whereby the box is prevented from turning.

B represents the main portion of the hub, and has projecting from it a horizontally-extending screw-threaded tubular core B', designed to receive the axle-box A. The portion B has upon its outer face a series of cuts or mortises $B^2$, into which the spoke-tenons are designed to rest. A second portion C of the hub is designed to be screwed or otherwise fixed upon the core B', and has a set-screw or pin $c$ to retain it in proper position after having been screwed into place.

F represents the spoke, having the tenons $f$ $f$, designed to enter the mortise in the box.

The portions B and C are provided with collars D and D', forming the end portions of the mortises, and being of a height equal to that of the flaring portion of the spoke-tenon.

The portion B and the dust-cap E are preferably made slightly polygonal in shape, in order to prevent the wrench from slipping while screwing them to the core.

The portion C of the hub is unscrewed from the main portion B, thus leaving the mortise $B^2$ open on one end. The spoke-tenons are then introduced into these mortises, one side of the tenons resting against the collar D on the portion B. The piece C is then screwed upon the core B' until the collar D' presses firmly against the tenon, when the set-screw $b$ is turned to hold the portion B' in position.

Having thus fully described my invention, what I claim as new, and desire to secure by Letters Patent, is—

In a hub, the combination, with the mortised ridge and the fixed collar having the slanting sides, of the spoke having tenons flaring at an angle corresponding in degree to that of the collar, substantially as and for the purposes described.

In testimony whereof I affix my signature in presence of two witnesses.

SHELLEY SAMUEL NUCKOLLS.

Witnesses:
J. C. ALMAND,
G. H. HULL.